United States Patent [19]
Seiner et al.

[11] Patent Number: 6,082,635
[45] Date of Patent: *Jul. 4, 2000

[54] UNDULATED NOZZLE FOR ENHANCED EXIT AREA MIXING

[75] Inventors: John M. Seiner, Williamsburg; Mikhail M. Gilinsky, Yorktown, both of Va.

[73] Assignee: The United States of America as represented by the Administrator of the National Aeronautics and Space Administration, Washington, D.C.

[ * ] Notice: This patent is subject to a terminal disclaimer.

[21] Appl. No.: 08/848,851

[22] Filed: May 2, 1997

Related U.S. Application Data

[63] Continuation of application No. 08/850,572, May 2, 1997
[60] Provisional application No. 60/020,966, Jun. 12, 1996, Pat. No. 5,924,632.

[51] Int. Cl.[7] .................................................. B63H 11/10
[52] U.S. Cl. ...................................... 239/265.19; 239/464
[58] Field of Search ............................. 239/265.19, 464; 60/226.1, 262, 271

[56] References Cited

U.S. PATENT DOCUMENTS

| | | | |
|---|---|---|---|
| 4,184,238 | 1/1980 | Carey | 239/265.43 |
| 4,284,170 | 8/1981 | Larson | 239/265.19 |
| 4,401,269 | 8/1983 | Eiler | 239/265.17 |
| 4,786,016 | 11/1988 | Presz | 244/130 |
| 5,402,964 | 4/1995 | Wygnawski | 60/271 X |

OTHER PUBLICATIONS

Seiner, John M., et al., "Supersonic Jet Noise and the High Speed Civile Transport", AIAA–89–2358, Jul. 10–12, 1989, 24 pgs.
Presz, Walter M., Jr., "Mixer/Ejector Noise Suppressors", AIAA–91–2243, Jun. 24–26, 1991, 11 pgs.
Ahuja, K. K., "Mixing Enhancement and Jet Noise Reduction Through Tabs Plus Ejectors", AIAA–93–4347, Oct. 25–27, 1993, 15 pgs.
Krothapalli, A. et al, "The Role of Streamwise Vortices on Sound Generation of a Supersonic Jet", AIAA 93–4320; Oct. 25–27, 1993; 11 pgs.
Seiner, John M. et al., "Nozzle Thrust Optimizationn While Reducing Jet Noise", CEAS/AIAA–95–149; Jun. 12–15, 1995; 22 pgs.
Seiner, J. et al., "Nozzle Thrust Optimzation While Reducing Jet Noise", AIAA 95–2191; Jun. 19–22, 1995; 27pgs.
Gilinsky, M. et al., "Corrugated Nozzles for Acoustic and Thrust Benefits"; AIAA/CEAS 96–1670; May 6–8, 1996; 31 pgs.

*Primary Examiner*—Kevin Weldon
*Attorney, Agent, or Firm*—Robin W. Edwards

[57] ABSTRACT

A nozzle having an undulating surface for enhancing the mixing of a primary flow with a secondary flow or ambient air, without requiring an ejector. The nozzle includes a nozzle structure and design for introducing counter-rotating vorticity into the primary flow either through (i) internal surface corrugations where an axisymmetric line through each corrugation is coincident with an axisymmetric line through the center of the flow passageway or (ii) through one or more sets of alternating convexities and cavities in the internal surface of the nozzle where an axisymmetric line through each convexity and cavity is coincident with an axisymmetric line through the center of the flow passageway, and where the convexities contract from the entrance end towards the exit end. Exit area mixing is also enhanced by one or more chevrons attached to the exit edge of the nozzle. The nozzle is ideally suited for application as a jet engine nozzle. When used as a jet engine nozzle, noise suppression with simultaneous thrust augmentation/minimal thrust loss is achieved.

18 Claims, 10 Drawing Sheets

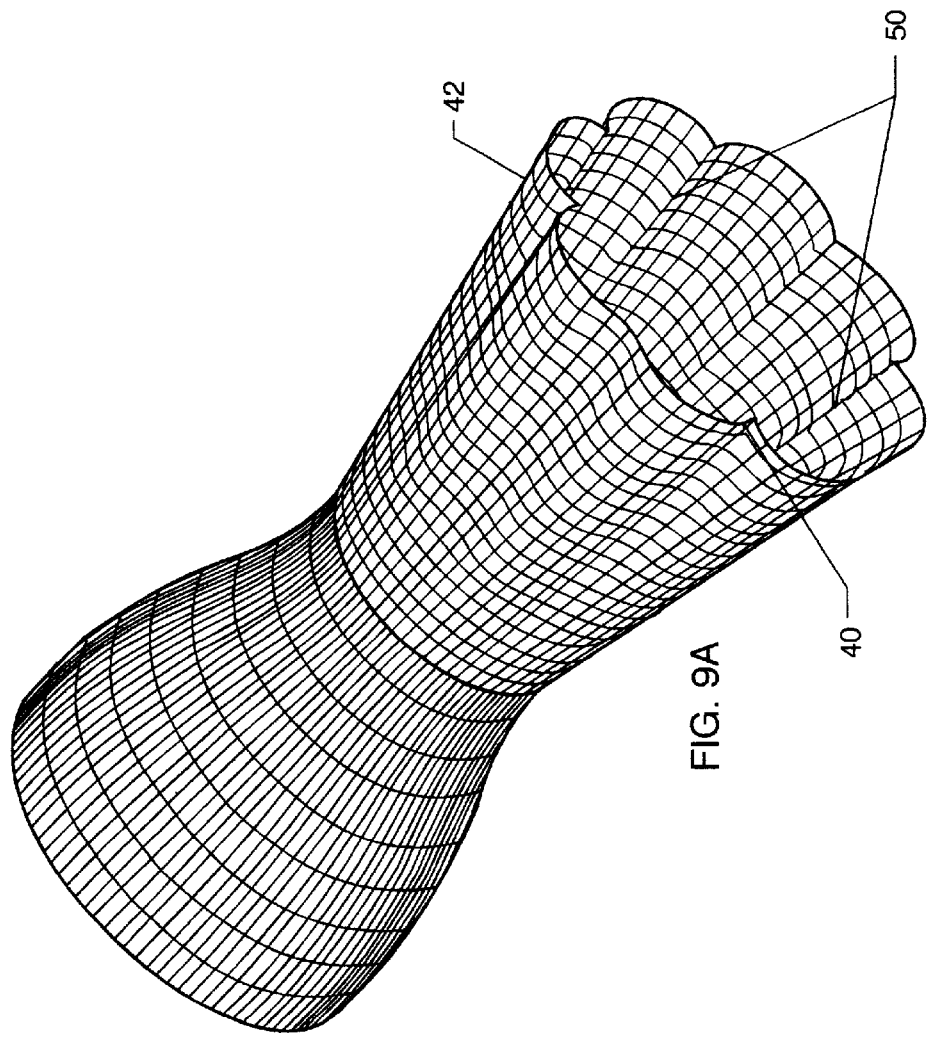
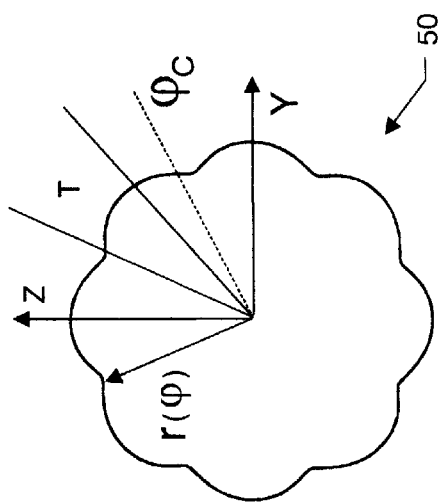
FIG. 9A
FIG. 9B

UNDULATED NOZZLE FOR ENHANCED EXIT AREA MIXING

Pursuant to 35 U.S.C. §119, the benefit of priority from provisional application 60/020,966, with a filing date of Jun. 12, 1996, is claimed for this non-provisional application.

CROSS-REFERENCE TO RELATED PATENT APPLICATIONS

This patent application is related to commonly owned patent application Ser. No. 08/850,572, filed May 2, 1997, now U.S. Pat. No. 5,924,632 entitled "Jet Nozzle Having Centerbody for Enhanced Exit Area Mixing" by the same inventors as this patent application.

ORIGIN OF THE INVENTION

The invention described herein was jointly made by an employee of the United States Government and a National Research Council Research Associate and may be manufactured and used by car for the Government for governmental purposes without the payment of any royalties thereon or therefor.

BACKGROUND OF THE INVENTION

1. Field of the Invention

The present invention relates generally to nozzles. More specifically, it relates to a nozzle having an undulating exit lip and/or a primary flow passageway defined by a cross-section that undulates about its periphery, which enhances mixing of a primary flow of a fluid (including a gas, liquid, or gas/liquid mixture) with a secondary flow of the first or a second fluid, or with ambient air, to achieve noise suppression and/or thrust augmentation without requiring the use of an ejector.

2. Description of the Related Art

Effective mixing of fluids from a nozzle with other fluids or ambient air is useful to a number of fields. Fluids, by this definition, broadly covers gases, liquids, and gas/liquid mixtures and any particulates they may carry, A flow, then, is a moving fluid. Nozzles which effectively enhance the mixing of so-called primary flows with secondary flows or ambient air are successfully employed in, and are useful to, the following applications: (i) jet engine nozzles; (ii) industrial spraying; (iii) public waste management systems; (iv) automotive fuel delivery systems; and (v) industrial mining. The exact configuration of an effective mixing nozzle will likely be application specific, dependent on the underlying purpose for the mixing.

A primary consideration in jet engine nozzle design is noise suppression. Noise suppression has traditionally been accomplished by mixing the primary flow of air from the engine with either a secondary flow of slower moving air or with the surrounding air in order to reduce the overall speed of the flow from the engine. Ejectors are devices which create and channel the secondary flow of slower moving air which then is mixed with the primary flow. As such, they have proven useful as means for noise suppression. This noise suppression occurs as the secondary flow from the ejector mixes and slows down the primary flow. Unfortunately, the effective thrust is diminished in the process. In addition, the use of an ejector adds to the cost, complexity and weight penalty of the jet engine. Overall, noise suppression through ejector technology is a trade-off with performance. Better noise suppression comes at a cost of lower performance, and vice versa. In a field where small differences in performance and cost matter greatly, the necessary presence of an ejector is significant.

Successful design of nozzle systems for supersonic commercial aircraft involves meeting both environmental and economic metrics. For nozzles, the environmental metric is noise, as expressed in the FAR 36 Stage III regulations. Economic metrics are usually associated with both take-off and cruise aeroperformance, weight, mechanical complexity, and structural reliability. As such, a successful nozzle design would be one that concurrently maximizes noise suppression and minimizes the loss of aeroperformance or, preferably, even improves aeroperformance. To date, no nozzle technology has been able to offer both improved aeroperformance (i.e. thrust augmentation) and noise suppression.

Current methods of designing nozzles for supersonic commercial applications rely heavily on state-of-the-art empirical methods. This is accomplished through the use of massive data sets from prior nozzle testing. This process is cumbersome and expensive. (See Seiner, J. M., and E. A. Kresja, 1989, *Supersonic Jet Noise and the High Speed Civil Transport*, AIAA Paper 89-2358, AIAA/ASME/SAE:/ASEE 25 Joint Propulsion conference, Jul. 10–12, 1989/ Monterey, Calif.) The most successful nozzle designs are based on nozzle geometry that controls the strength of shock waves, that can rapidly mix high and low speed flow streams effectively, and produce noise spectrally outside the range of Noy weighting. Present nozzle designs that are effective at reducing noise at low jet exhaust velocities must make a disappointing trade off with nozzle performance. This is especially true in the case of subsonic jet noise reduction where noise reduction is achieved primarily through an increase of engine by-pass ratio which leads to low mixed flow velocities.

Some attempts have been made to optimize both the aeroacoustic suppression characteristics and suppressed mode performance in nozzle design, especially for those targeted towards operation at low jet exhaust velocities. On the lobed mixer of Presz, counter-rotating axial vorticity generated by mixer lobes is used to mix high speed engine primary core and fan stream flow with entrained lower speed secondary flow from an ejector inlet. (See Presz, Jr., Walter M. 1991, *Mixer/Ejector Noise Suppressors*, AIAA Paper 91–2243, 27th Joint Propulsion Conference, Jun. 24–26, 1991/ Sacramento, Calif.) The enhanced mixing is used to both increase the level of secondary flow entrainment and mix high and low stream flow to achieve lower speed uniform ejector exit velocity that has an acceptable level of external jet noise. An ejector, with its attendant deficiencies, is required to take advantage of counter-rotating vorticity created by the mixer lobe geometry. The current state-of-the-art technology has not yet adequately related the design of lobe geometry to prediction of circulation strength of counter-rotating vorticity nor has it determined the circulation strength required to achieve full mixing in the shortest possible ejector duct. Additionally, both aeroperformance computations and nozzle internal noise computations cannot be treated with sufficient accuracy to optimize the design. A similar observation of nozzle suppression effectiveness has been made for other nozzle concepts.

Others advocate a different approach to nozzle noise suppression. Some propose mounting devices inside the nozzle flow passageway (e.g. fingers) or at the nozzle exit (tabs) in order to destroy the usual plume structure, create additional mixing layers and reduce jet velocity thereby favoring noise suppression. (See Ahuja, K. K., 1993, *Mixing Enhancement and Jet Noise Reduction Through Tabs Plus*

*Ejectors*, AIAA Paper 93- 4347, 15th AIAA Aeroacoustics Conference, Oct. 25–27, 1993/ Long Beach, Calif., Also See Krothapalli, A. and King, C. J., 1993, *The Role of Streamwise Vortices on Sound Generation of a Supersonic Jet,* 15th Aeroacoustics Conference, Oct. 25–27, 1993/ Long Beach, Calif.) These devices, however, are sources of additional drag, resulting in significant aeroperformance penalties. Mechanical devices, like fingers, add to the cost and complexity of the nozzle and often require a secondary flow from an ejector. Tabs, which protrude into the primary flow, show promise in disrupting and mixing the flow. While offering some noise suppression benefits, tabs do not offer any advantage augmenting thrust. Others have suggested "notching" or "slotting" nozzle ends to improve mixing. Like tabs, slots may improve mixing somewhat but they too do not offer any advantage in augmenting thrust. The same penalties are seen in the "transition nozzles" application analyzed by Sobota, in which the nozzle passageway is altered, for example, from a round cross-section to a rectangular cross-section at the exit in order to separate the flow and create counter-rotating vorticity. (See Sobota, Thomas, 1992, *Final Report: Reduction of Supersonic Plume Noise through the Controlled Introduction of Axial Vorticity,* NASA—Langley Research Center, SBIR Program, Contract #NAS1-19514, Oct. 1, 1992/Hightown, N.J.) Swept steps and centerbodies are used in conjunction with the nozzle shape 'transition' to further separate the flow. Even though counter-rotating vorticity is introduced into the flow, the resultant location and strength of the counter-rotating vorticity minimize any advantage obtained.

There is an ever present need for new, improved nozzle designs for enhancing the mixing of a primary flow with a secondary flow or ambient air to achieve noise suppression and/or thrust augmentation for a jet engine nozzle without requiring the use of an ejector. In addition, there is a need for such nozzles which allow for ready optimization without involving the cumbersome and expensive process of designing and altering jet nozzles from the empirical analysis of massive data sets (a trial and error method).

Nozzles utilizing lobed mixers with an ejector or nozzles with one or more slots, fingers, or tabs suffer from the disadvantages of requiring an ejector, requiring a substantial trade-off between noise-suppression and aeroperformance, having no allowance for simultaneous noise suppression and thrust augmentation, and/or having the incapability of optimization through geometric nozzle parameter variation control.

SUMMARY OF THE INVENTION

It is accordingly an object of the present invention to provide a nozzle for effectively enhancing the mixing of a primary flow with a secondary flow or ambient air to achieve noise suppression without requiring the use of an ejector.

Another object is to provide a nozzle for effectively enhancing the mixing of a primary flow with a secondary flow or ambient air to achieve thrust augmentation (or thrust loss minimization) without requiring the use of an ejector.

Yet another object of the present invention is to provide a nozzle for effectively enhancing the mixing of a primary flow with a secondary flow or ambient air to achieve noise suppression and thrust augmentation (or thrust loss minimization) without requiring the use of an ejector.

A further object is to provide a nozzle design which allows for the optimization of nozzle performance through control of geometric nozzle parameter variations.

Other objects and advantages of the present invention will become more obvious hereinafter in the specification and drawings.

In accordance with the present invention, a nozzle comprises a means for introducing counter-rotating axial vorticity into the primary flow without requiring an ejector. Two readily distinguishable variations of the embodiments exist: the "Bluebell" and the "Chisel-Bluebell" nozzles. Both variations have an undulating exit lip and/or a primary flow passageway defined by a cross-section that undulates about its periphery. The cross-section undulations can be in the form of corrugations or a convexities/concavities combination. To enhance the mixing of high speed primary flow with low speed secondary flow, the Bluebell nozzle involves the use of internal corrugations to generate counter-rotating axial vorticity through pressure differences. Protrusions from the nozzle exit end ("chevrons") may be added to further enhance mixing by increasing the lateral area (i.e. nozzle exit perimeter) over which the flows mix and on which the primary flow acts. The Chisel-Bluebell nozzle also enhances the mixing of high speed primary flow with low speed secondary flow. The Chisel-Bluebell nozzle involves the use of alternating internal cavities and convexities to generate counter-rotating axial vorticity through a gradual formation of a swirl flow over the internal nozzle geometry. Chevrons may also be added to further enhance mixing.

The Bluebell nozzle provides a number of advantages over the related art. No ejector is required to get noise suppression benefits. The introduction of counter-rotating vorticity into the primary flow through internal corrugations allows for significant noise reduction with thrust augmentation or minimal thrust loss. The introduction of counter-rotating vorticity through corrugations is a variable independent from the enhanced mixing achieved through chevrons.

A Bluebell nozzle may be constructed on the base of any plain nozzle: axisymmetric round, conical, elliptical, triangular, rectangular, or two dimensional convergent-divergent planar. It may be constructed as a convergent or a convergent-divergent nozzle, for subsonic or supersonic engines respectively. The perimeter of the effective exit edge may be increased with the addition of chevrons which increase the contact between the primary flow and a secondary flow or ambient air. The chevrons may, but need not, take the shape of a sine sheet attached at the nozzle exit. For example, a discontinuous profile such as a triangular or rectangular cut-out can be used.

The Chisel-Bluebell nozzle further improves upon the advantages of the Bluebell nozzle. In addition to introducing counter-rotating vorticity into the primary flow along the inner surface of the nozzle, the internal geometry of the convexities and cavities results in (i) a continued increase in the introduction of the counter-rotating vorticity as the primary flow expands into the surface cavities as it passes through the nozzle, and (ii) the expanded portions of the primary flow in which counter-rotating vorticity have been introduced meet each other at some angle, mutually penetrate, and further enhance the mixing of the primary flow with a secondary flow or ambient air. Unlike the Bluebell nozzle, in which the streams of counter-rotating vorticities exit the nozzle in a divergent fashion, the Chisel-Bluebell nozzle channels the streams of counter-rotating vorticity into each other to further enhance mixing. A third, and significant, advantage of the Chisel-Bluebell nozzle is that the design allows for noise reduction and a simultaneous thrust augmentation or minimal thrust loss, above and beyond that achieved with a standard Bluebell nozzle. Thrust augmentation and noise reduction, without the use of an ejector, were previously considered mutually exclusive.

The internal geometry of the nozzle is such that the primary flow acts on the nozzle wall with more pressure than that exerted even in the Bluebell nozzle. The more powerful thrust is obtained by contracting the inner surface convexities to the exit so that a gradual formation of a swirl flow (having counter-rotating vorticities) results.

As detailed below, the present invention is a nozzle for enhancing mixing of a primary flow with a secondary flow or ambient air without requiring an ejector. The present invention is particularly well-suited for application in the field of jet engine nozzles, and it comprises a nozzle structure and a means of introducing counter-rotating vorticity into the primary flow so that when the primary flow passes through the center of the nozzle (i.e. a nozzle passageway) counter-rotating vorticity in the primary flow results.

A nozzle structure includes an exit end, an exit edge, an entrance end, an entrance edge, and a surface which, in turn, includes an inner surface and an outer surface. The inner surface forms a flow passageway for a primary flow through the center of the nozzle structure. An exit edge connects both the inner and outer surfaces, and an entrance edge connects both the inner and outer surfaces. Both the entrance and exit edges have perimeters. The entrance end is located at the situs of the entrance edge, and is encircled by the entrance edge. The exit end is located at the situs exit edge, and is encircled by the exit edge.

Counter-rotating vorticity is introduced into the primary flow through geometric perturbations of the nozzle inner surface. One option is for the inner surface to have one or more corrugations (Bluebell). The corrugation(s) are formed in the surface along the length of the nozzle in such a way that an axisymmetric line through each corrugation is coincident with an axisymmetric line through the center of the flow passageway. When these corrugations are used, primary flow passing through the flow passageway will introduce counter-rotating vorticity adjacent to the inner surface in each corrugation. This occurs through flow expansion and pressure differences.

Another option is for the inner surface to have one or more sets of alternating convexities and cavities (Chisel-Bluebell). These cavities and convexities may have either hard or smoothed edges. The cavities and convexities alternate along the length of the inner surface in such a way that an axisymmetric line through each cavity and convexity is coincident with an axisymmetric line through the center of the flow passageway. In addition, the convexities must contract from the entrance end to the exit end. The cavities and convexities need not extend completely from the entrance end to the exit end, but that is the direction in which the convexities contract. The number of corrugations or sets of cavities and convexities is theoretically unlimited, however the number of either will likely be less than sixteen and more probably eight or less. It is expected that the outer surface of the nozzle will generally follow the shape of the inner surface. It is not necessary, but preferred, that the outer surface will roughly follow the shape of the inner surface in a plane perpendicular to an axisymmetric line through the center of the flow passageway. It is also not necessary, but preferred, that an imaginary line of the outer surface that is coplanar with an axisymmetric line through the center of flow passageway will roughly follow an imaginary line which is also coplanar with both the previously mentioned imaginary line on the outer surface and the axisymmetric line through the center of the flow passageway. Either the Bluebell nozzle or the Chisel-Bluebell nozzle may be constructed on any nozzle shape, including axisymmetric round, rectangular, conical, triangular, two dimensional convergent-divergent planar, and elliptical.

In order to further enhance the mixing of the primary flow with the secondary flow or ambient air, either the standard Bluebell nozzle or the Chisel-Bluebell nozzle may further comprise one or more protrusions (chevrons) attached to the exit edge of the nozzle. Chevrons, unlike tabs, do not project into the primary flow, but instead follow the flow. The chevrons increase the perimeter of the exit edge, creating an effective exit edge which is larger than the exit edge, so that there is increased contact between the primary flow and the secondary flow or ambient air. The effective edge is comprised of the exposed edge of each chevron plus the edge of the nozzle that is not covered by a chevron. While the theoretical number of chevrons is unlimited, it is envisioned that sixteen or less will be used, and more probably eight or less will be used. It is not necessary that the number of chevrons equal the number of corrugations (or convexities/cavities), but it is preferred. It is also preferred, but not necessary, that the chevrons be located so that the chevron peak is situated where the inner surface of a corrugation (cavity) is at its greatest distance from an axisymmetric line through the center of the flow passageway. A chevron may have any shape. The preferred shape is that of a sinusoidal curve where each chevron is a peak on the curve bounded by two troughs.

The Bluebell and Chisel-Bluebell embodiments may have an additional feature in which a second nozzle, which can be a baseline nozzle, Bluebell nozzle or Chisel-Bluebell nozzle, each with or without chevrons, is mounted on the inner surface of each convexity within the first (or each subsequent) nozzle. Adding a "telescope" extension such as this allows for the determination of the frequency of the resultant noise based on the height of the convexities. Using a telescope can be a successful tool in creating a noise pattern which minimizes sonic fatigue of engine parts and minimizes the sound pattern audible to humans or wildlife.

By way of illustrative example, beneficial results have been achieved for the Bluebell nozzle embodiment when the nozzle is based on a convergent-divergent, axisymmetric round baseline nozzle having eight corrugations and eight chevrons with a sinusoidal curve shape and where each chevron coincides with a corrugation so that when the primary flow passes through the nozzle from the entrance end to the exit end, counter-rotating vorticity is introduced into the primary flow adjacent to the inner surface at each corrugation. Also by way of illustrative example, beneficial results have been achieved for the Chisel-Bluebell nozzle when the nozzle is based on a convergent-divergent, axisymmetric round baseline nozzle with eight sets of cavities and convexities and no chevrons, so that when the primary flow passes through the nozzle from the entrance end to the exit end, counter-rotating vorticity is introduced into the primary flow adjacent to the convexity edge and adjacent to the inner surface of each cavity.

BRIEF DESCRIPTION OF THE DRAWINGS

These and other features and advantages of the present invention will be readily apparent from the following detailed description of the embodiments of the present invention, particularly when taken in connection with the accompanied drawings wherein like reference numerals refer to like parts and wherein:

FIG. 9A is a perspective view of another embodiment of the present invention; a convergent-divergent, smoothed-edge Chisel-Bluebell nozzle having eight sets of alternating cavities and convexities.

FIG. 9B is a cross-sectional view (Y-Z plane) of the embodiment depicted in FIG. 9A.

DETAILED DESCRIPTION OF THE INVENTION

Figure 1:
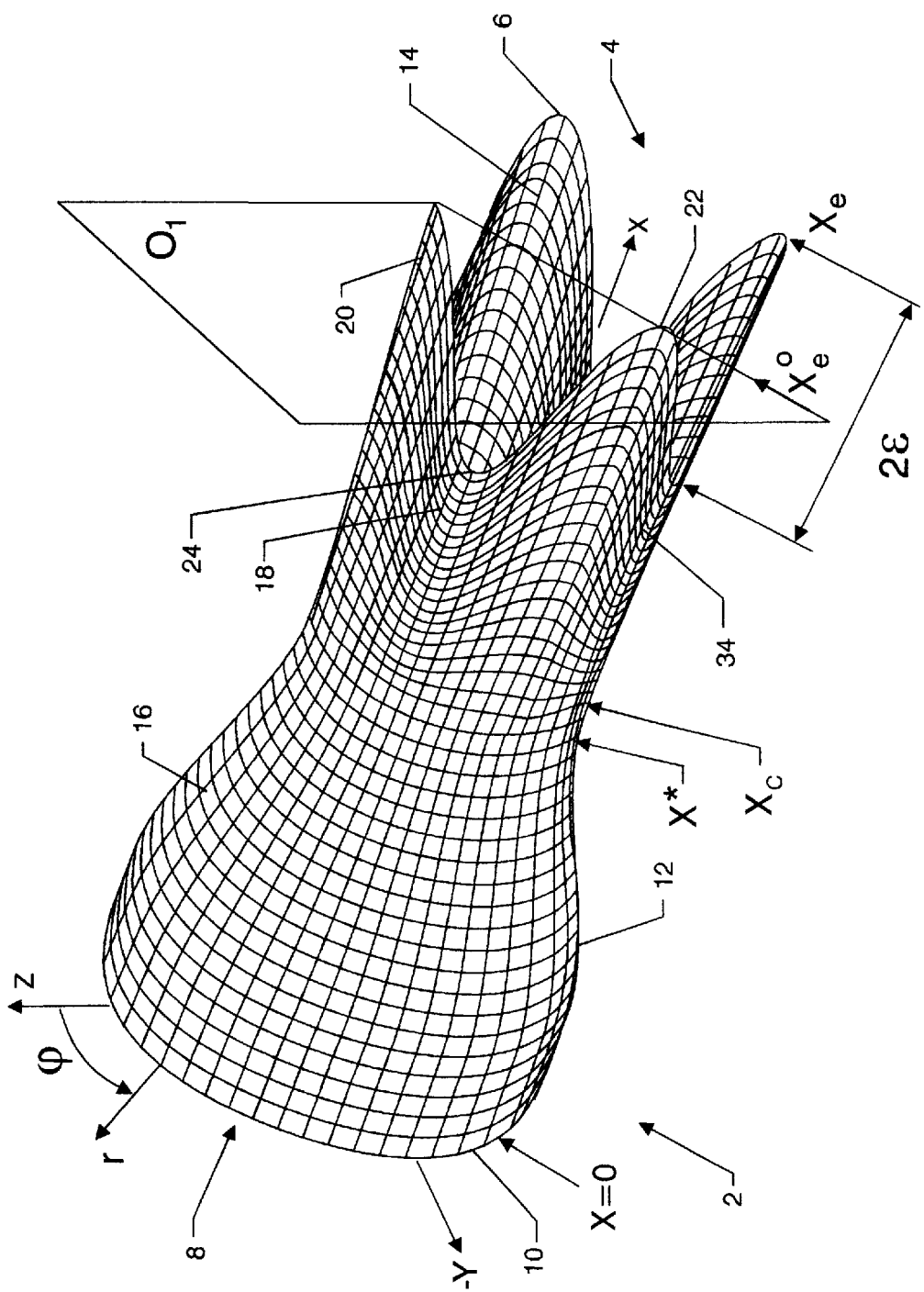
FIG. 1 is a perspective view of one embodiment of a nozzle according to the present invention; a convergent-divergent Bluebell nozzle having four corrugations and four chevrons.

Referring to the drawings in more detail, the present invention is particularly adapted to be embodied as one of two readily distinguishable variations, the Bluebell nozzle and the Chisel-Bluebell nozzle. For purpose of illustration, cage lines are used in FIG. 1 and throughout the figures to provide a three-dimensional perspective.

A. Bluebell

A Bluebell nozzle structure may be constructed on the base of any plain nozzle; e.g., axisymmetric round, conical, elliptical, triangular, rectangular, or two dimensional convergent-divergent planar. Referring to FIG. 1, the Bluebell nozzle embodiment may be described as being generally comprised of one or more corrugations 18 formed in a nozzle structure 2 which is itself comprised of an exit end 4, an exit edge 6 (where the exit edge may be the baseline nozzle exit edge where no chevrons are used or the effective exit edge where chevrons are used, as later discussed herein), an entrance end 8, an entrance edge 10, and a surface 12. The surface, in turn, is comprised of an inner surface 14 and an outer surface 16. The inner surface 14 forms a flow passageway through the center of the nozzle structure 2 through which the primary flow passes. The exit edge 6 and entrance edge 10 connect the inner surface 14 and outer surface 16. The entrance edge 10 encircles the entrance end 8, and the exit edge 6 encircles the exit end 4. Axisymmetric lines through each corrugation coincide with an axisymmetric line through the center of the nozzle structure. Chevrons 20, attached to exit edge 6, are protrusions defined by a peak 22 bounded by two troughs 24. Nozzle 2 is representative of any conventional nozzle, e.g., single-contour, two-contour, convergent, divergent, co-annular, etc., and does not represent a limitation of the present invention.

Figure 2:
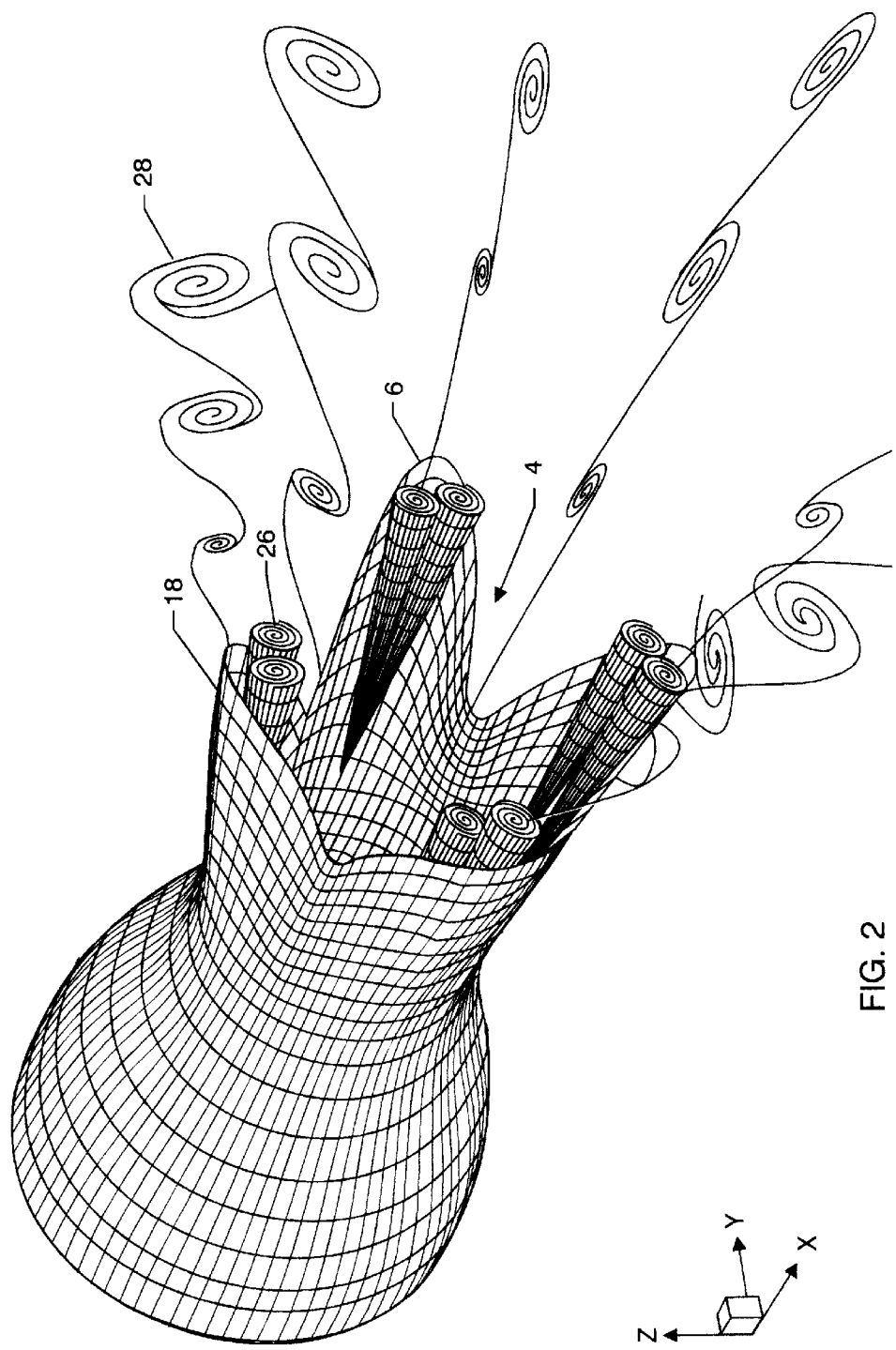
FIG. 2 is a perspective view of the embodiment depicted in FIG. 1 schematically illustrating the location of vortices created upstream and downstream of the nozzle exit.

Like identifications are used in all figures for analogous features. Referring to FIG. 2, the corrugations 18 create vortices 26 in the nozzle exhaust at and/or near the nozzle's exit. More specifically, counter-rotating or anti-symmetric vortices 26 are created adjacent to the nozzle's inner surface upstream of the exit end. These upstream vortices 26 then meet at some angle at the exit end to generate a larger vortex 28 downstream of the exit end. The internal corrugations 18 introduce counter-rotating vorticity 26 into the primary flow through pressure differences as it passes through the nozzle structure 2. Vortices 26 meet at exit end 4 and form the larger vortices 28 downstream of exit end 4. This mixing can be further enhanced through the use of chevrons attached to the exit edge 6. The chevrons further enhance mixing by increasing the lateral area (i.e. nozzle exit perimeter) over which the flows mix and on which the primary flow acts. The corrugations begin at a point such that a change from supersonic to subsonic flow is prevented; i.e., at a point where the flow has accelerated to greater than Mach 1.

As stated earlier, the Bluebell nozzle may be constructed on the base of any plane nozzle. For the axisymmetric round baseline nozzle contour, described by the function $R=R_o(x)$ in a meridional plane $\phi$=constant, the function $R_n(x)$ describes the Bluebell nozzle geometry. The convergent part is represented by a cubic parabola, and the divergent part is calculated by any standard method; e.g., the method of characteristics (MOC) for supersonic flow. A representative example of Bluebell nozzle surface geometry, Cartesian (x,y,z) and cylindrical (x,r, $\phi$) coordinates are illustrated in FIG. 1. The x axis coincides with the nozzle axis of symmetry.

As shown in FIG. 1, a Bluebell nozzle may have a sinusoidal lip line edge, i.e. the nozzle edge distance from the nozzle throat, $x=x_e$ that changes sinusoidally versus the azimuth anglers $\phi$ with variation in amplitude $\epsilon$. The cross sections of the nozzle's divergent part also can be limited by sinusoidal curves vs angle $\phi$, so that the variation amplitude in surface r(x, $\phi$) increases along a nozzle centerline from zero at the cross-section $x=x_c$ downstream of the throat, $x=x_*$, to the maximum value at the exit $\delta=\delta_o(x-x_c)$. The cross section, $x_c$, is chosen to have an axial flow velocity slightly exceeding 0.01 to 1.03 the local sound velocity. Finally, the lateral surface equation of a Bluebell nozzle can be written as:

$$0 \leq x \leq X_e(\phi), \quad (1a)$$

$$r(x,\phi)=R_n(x)[1+\delta \cos(n_c\phi)], \quad (1b)$$

$$x_e\phi=x_e^0[1+\cos(n_p\phi)], \quad (1c)$$

where $n_p$ and $n_c$ are variation frequencies of longitudinal lip line change and cross section, respectively. The values $n_p$ and $n_o$ are assumed to be even numbers. For simplification of description, the variations r(x,$\phi$) and $x_e(\phi)$ are denoted as corrugations 18 and chevrons 20, respectively. The mass flow rate for the Bluebell and baseline nozzles is the same in each cross section. Thus, at each nozzle cross section, Bluebell nozzles have the same cross section area, $S_n(x)$, as the reference baseline nozzle, $S_0(x)$. From this equality in cross section area, the coordinates $R_n(x)$ are derived from equations (1a) through (1c). Bluebell nozzle cross section area $S_n(x)$ is calculated by the simple formula and function $R_n(x)$ explicitly expressed by baseline radius $R_0(x)$:

$$S_n(x) = \frac{1}{2}\int_0^{2\pi} r^2(x,\varphi)d\varphi = \pi R_n^2(x)\left(1 + \frac{\delta^2}{2}\right) \quad (1d)$$

$$R_n(x) = R_0(x)\bigg/\sqrt{\left(1 + \frac{\delta^2}{2}\right)} \quad (1e)$$

Here it is assumed that:

$$R_0(x) = R_0(x_e^0) \text{ for } x \geq x_e^0 \quad (1f)$$

where $x \geq x_e^0$ is a baseline round nozzle edge.

Figure 3:
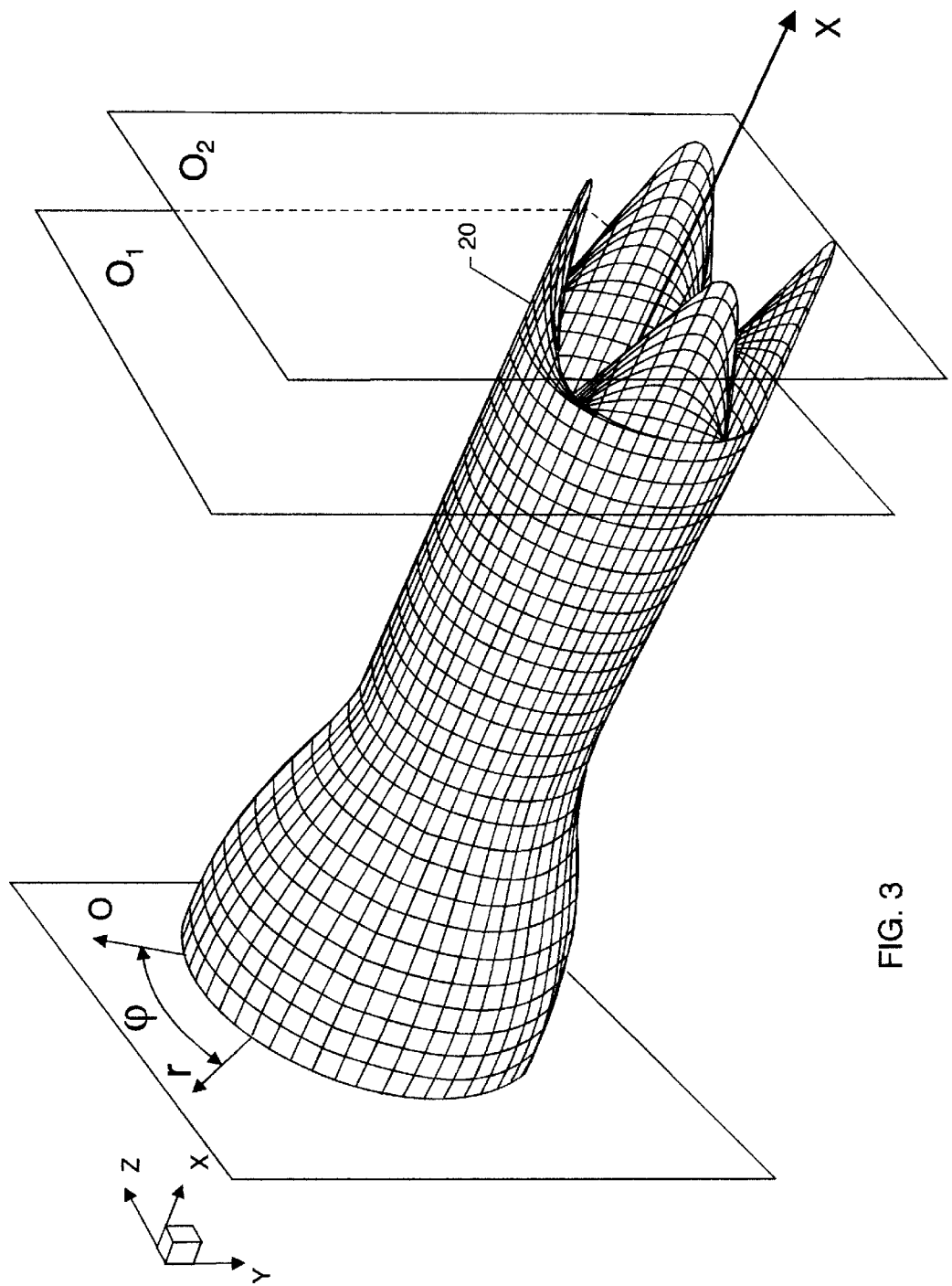
FIG. 3 is a perspective view of a nozzle having chevrons only.

An alternate method to define chevrons is to simply define the shape in a spherical coordinate system. This method is used for conical nozzles. Consider the divergent portion of a convergent-divergent axisymmetric baseline round nozzle. FIG. 3 illustrates a nozzle having chevrons only. A conical sine sheet is deformed with the equation below. The conical sheet forms chevrons 20 between the exit cross section, $O_1$, and a final cross-section downstream, $O_2$. The new exit point, at which the primary flow through the nozzle makes contact with ambient air, is defined as a point on a sinusoidal curve (i.e. a spatial curve), defined by the following:

$$\rho = \rho(\phi) = 0.5[(\rho_2 + \rho_1) + \cos(n^* \phi)^*(\rho_2 - \rho_1)] \quad (2)$$

where $\theta = \theta_c$ (where $\theta_c$ is the cone angle) and $n = 0, 1, 2, 3 \ldots$ In addition, maximum $\rho = \rho_2 = $ constant, and minimum $\rho = \rho_1 = $ constant, and $0 \leq \phi \leq 2n$ and $\rho_2 > \rho_1$. The spherical coordinate system $(\rho, \theta, \psi)$ has a center point O, and $\phi$ is the polar coordinate in the cylindrical coordinate system $(x, r, \phi)$ where the axis corresponds to the cone axis. The p axis corresponds to the nozzle's axis of symmetry. The number of chevrons 20 are defined by, $n_p$, the mode coefficient.

Figure 4:
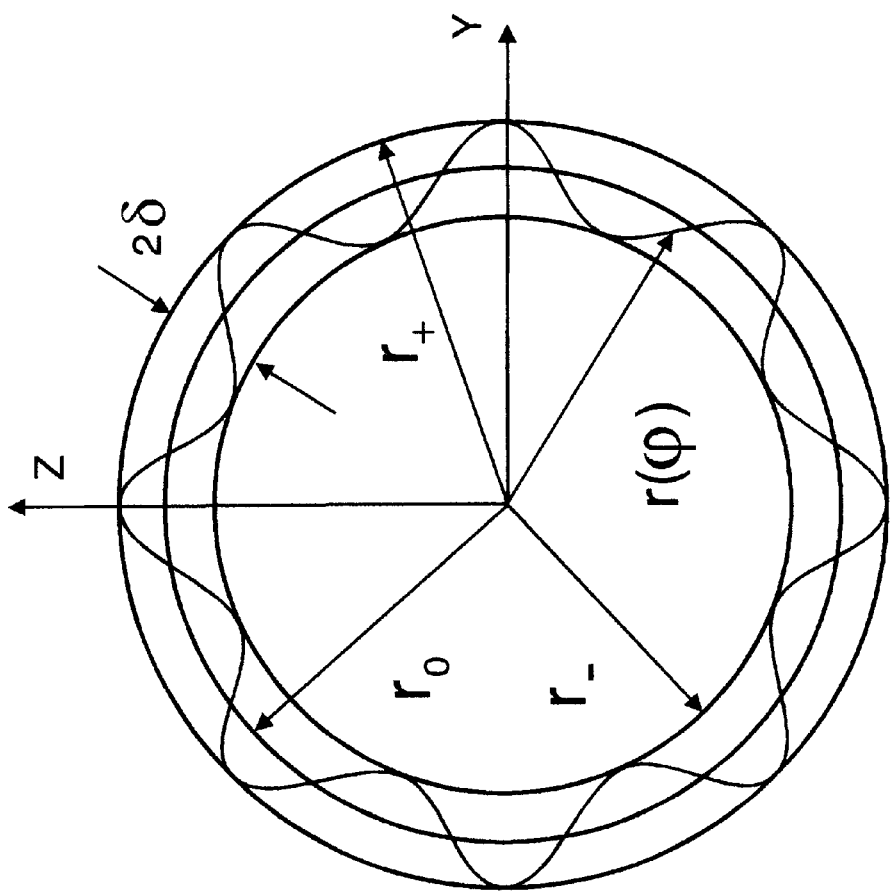
FIG. 4 is a cross-sectional view (Y-Z plane) of c convergent-divergent Bluebell nozzle having eight corrugations.

FIG. 1 illustrates a convergent-divergent nozzle having four corrugations 18 and four chevrons 20, where the chevrons 20 and corrugations 18 are coincident with each other. The Cartesian coordinates (x,y,z) and cylindrical coordinates (x,r,φ) are illustrated. In addition, the entrance end is located where x=0 and z=0; $x_*$=the nozzle throat; $x_c$=beginning of the sinusoidal cross-section variation of nozzle radius; $x_e^0$=a baseline nozzle edge; $X_e$=a Bluebell nozzle effective exit edge, which delineates the attached chevron; ε=chevron amplitude coefficient ; $n_p$=chevron frequency, where $n_p$=4. The chevron and corrugation frequencies are identical (i.e. $n_p$=$n_c$). This illustrative example may be modified by increasing or decreasing the number of corrugations. A cross-section of a nozzle having eight corrugations is illustrated in FIG. 4. In FIG. 4, $r_0 = R_0(x)$ where $R_0(x)$ is the radius of an "equivalent" round nozzle. Also, $r_\pm$=maximum and minimum radius values; a corrugation amplitude coefficient $\delta = \frac{1}{2}(r_+ - r_-)$; $r(\phi)$ is a cross-section nozzle, $n_c$ is a corrugation frequency and in this example, as stated above, $n_c$=8. Chevrons 20 can be attached to the exit edge of the baseline nozzle so that the Bluebell nozzle surface area is always larger than the corresponding baseline nozzle surface area, as shown in FIG. 3, or, as shown in FIG. 1, the plane $O_1$ corresponding to the round baseline nozzle is located in the section $x=x_e^0$ so that the Bluebell nozzle surface area is equal to the baseline nozzle surface area.

B. Chisel-Bluebell

Like the Bluebell nozzle, the Chisel-Bluebell nozzle enhances mixing of a high speed primary flow with a low speed secondary flow (or ambient air) through the use of perturbations of the surface.

Figures 5A, 5B:
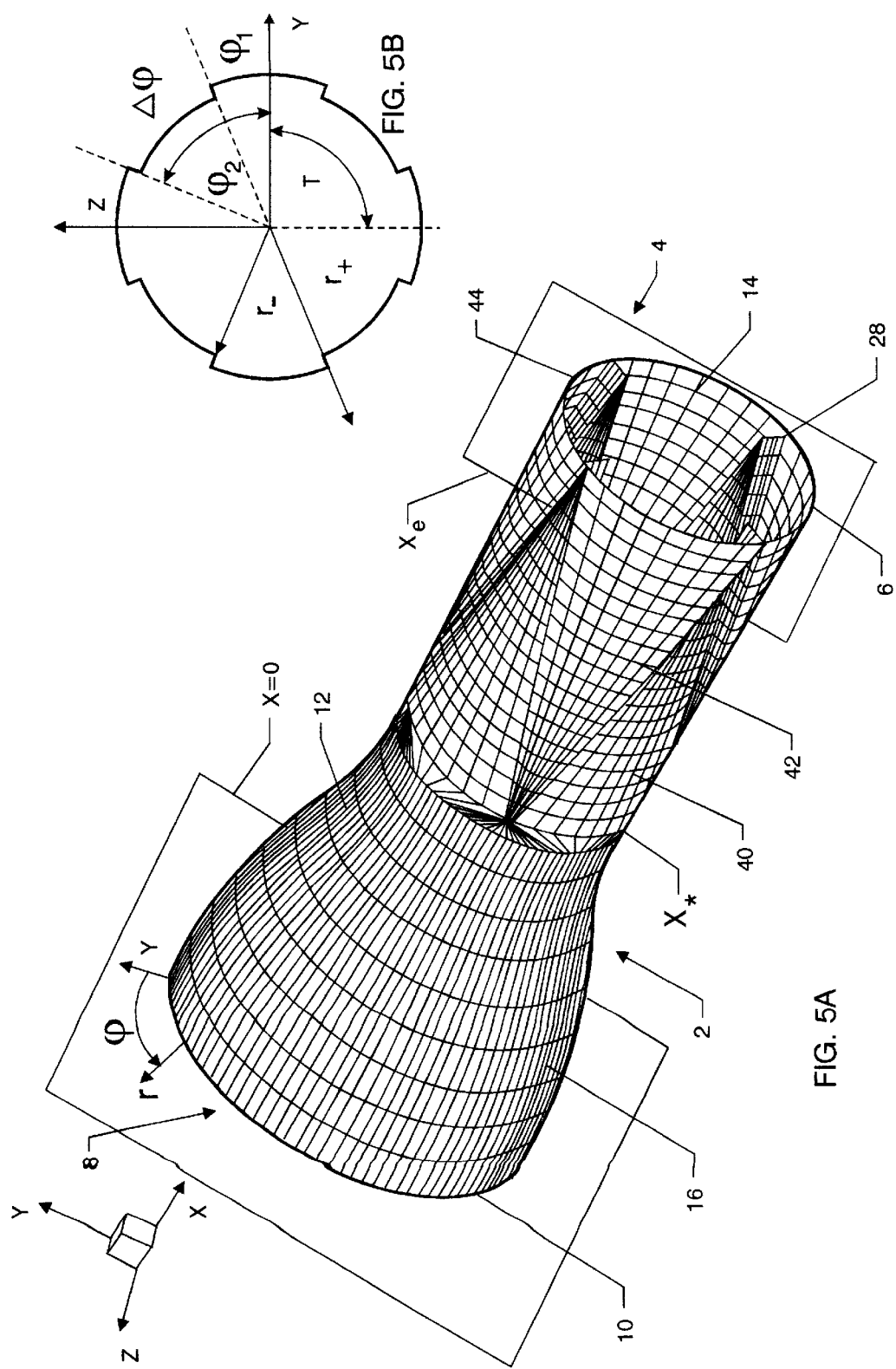
FIG. 5A is a perspective view of an embodiment of a nozzle according to the present invention; a convergent-divergent, hard-edge Chisel-Bluebell nozzle having four sets of alternating cavities and convexities.
FIG. 5B is a cross-sectional view (Y-Z plane) of the embodiment depicted in FIG. 5A.

Referring to FIG. 5A, the Chisel-Bluebell nozzle embodiment may be described as being generally comprised of one or more sets of alternating cavities 40 and convexities 42 formed in a nozzle structure 2 which is itself comprised of an exit end 4, an exit edge 6, an entrance end 8, an entrance edge 10, and a surface 12. The surface, in turn, is comprised of an inner surface 14 and an outer surface 16. The inner surface 14 forms a flow passageway through the center of the nozzle structure 2 through which the primary flow passes. The exit edge 6 and entrance edge 10 connect the inner surface 14 and outer surface 16. The entrance edge 10 encircles the entrance end 8, and the exit edge 6 encircles the entrance end 4. Axisymmetric lines through each cavity 40 or convexity 42 are coincident with an axisymmetric line through the center of the nozzle structure 2. The cavities 40 and convexities 42 formed in the surface of the nozzle structure 2 may have hard edges 44, as shown in FIG. 5A, or smoothed edges 50, as shown in FIGS. 9A and 9B.

As illustrated in FIG. 5A, a Chisel-Bluebell nozzle may be constructed as a convergent-divergent nozzle with four sets of alternating convexities 42 and cavities 40 ($n_c$=4), hard edges 44, and based on an axisymmetric round baseline nozzle. The illustrated nozzle does not have chevrons attached. The entrance end is located at x=0, and the exit end is located at $x=x_e$. FIG. 5B Illustrates a cross-sectional view (Y-Z plane) of the divergent portion of the embodiment depicted in FIG. 5A. The cross-sectional nozzle contour is defined by $r(\phi)$ and $\Delta(\phi)$.

Figure 6:
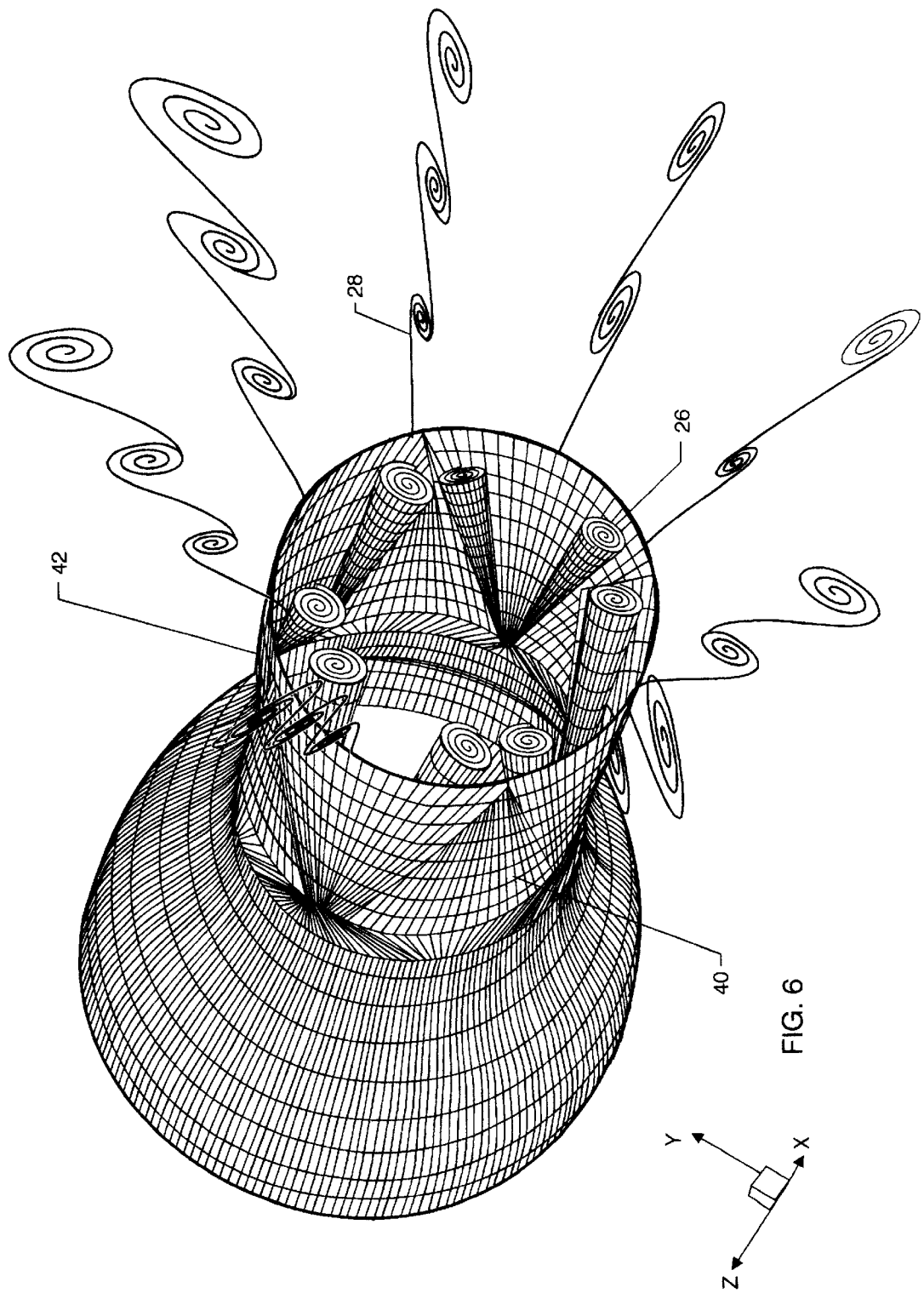
FIG. 6 is a perspective view of the embodiment depicted in FIGS. 5A and 5B schematically illustrating the location of vortices created upstream and downstream of the nozzle exit.
Figure 7:
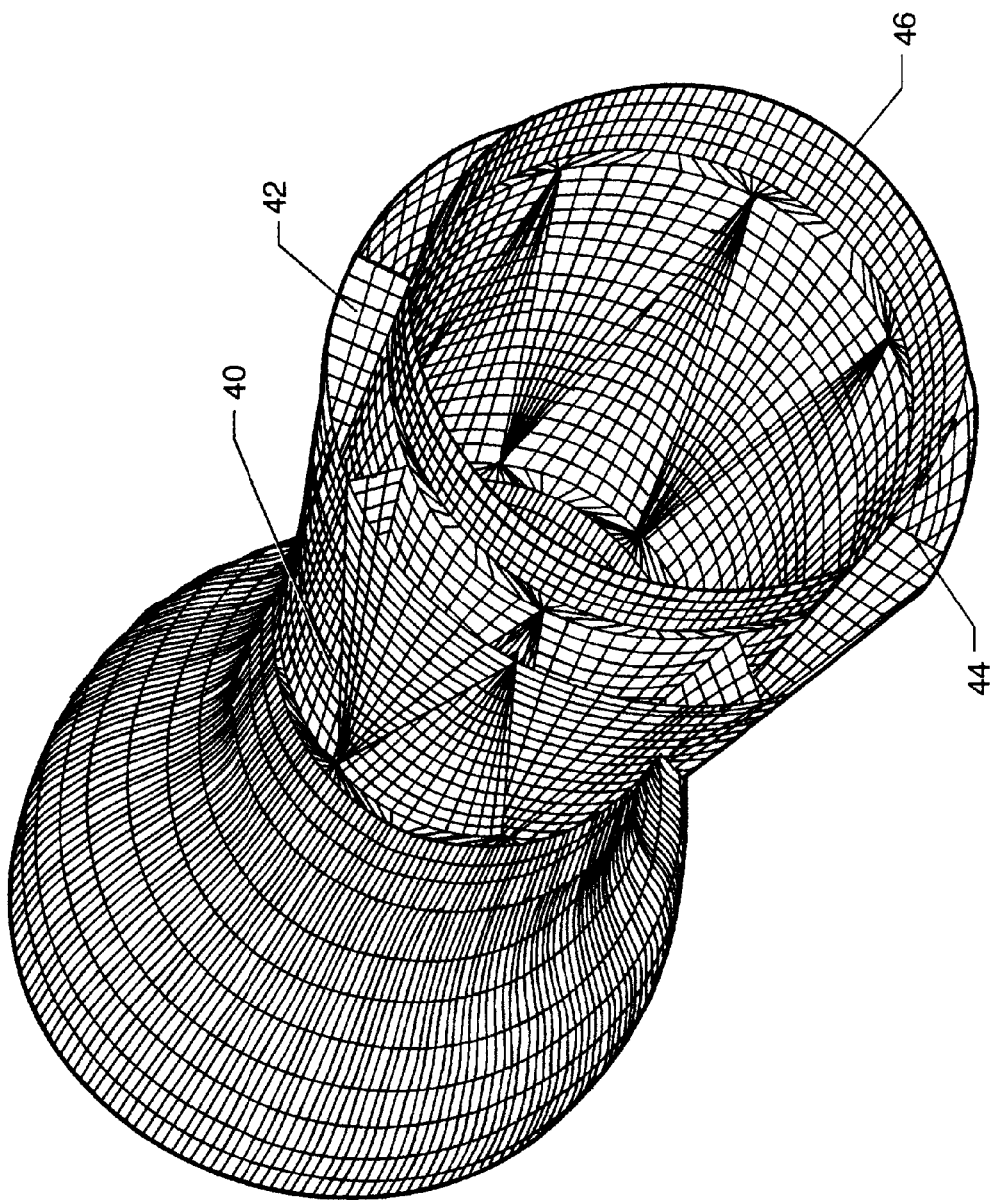
FIG. 7 is a perspective view of a Chisel-Bluebell nozzle having an internal Chisel-Bluebell nozzle telescope extension supported by the external Chisel-Bluebell nozzle's convexities.
Figure 8:
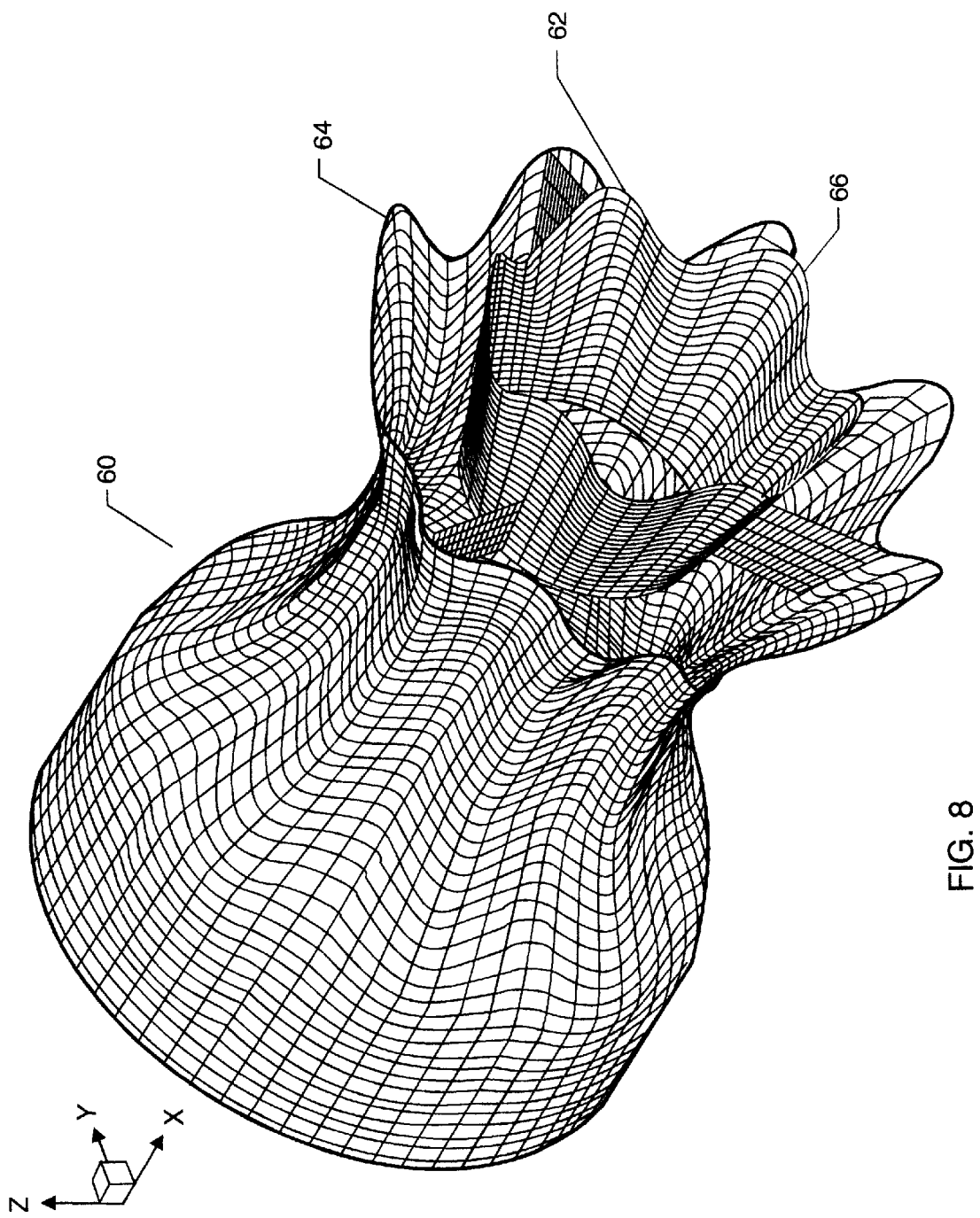
FIG. 8 is a perspective view of a Bluebell nozzle have an internal Bluebell nozzle telescope extension.

Referring to FIG. 6, the Chisel-Bluebell embodiment employs the alternating cavities 40 and convexities 42 to introduce counter-rotating vorticity 26 into the primary flow as it passes through the nozzle structure 2. The vortices 26 then generate a larger vortex 28. This mixing could be further enhanced through the use of chevrons attached to the exit edge. The chevrons further enhance mixing by increasing the lateral area (i.e. nozzle exit perimeter) over which the flows mix and on which the primary flow acts. The Bluebell and Chisel-Bluebell nozzle embodiments may have an additional feature in which a second nozzle, which can be a baseline nozzle, Bluebell nozzle or Chisel-Bluebell nozzle, with or without chevrons, is mounted on the inner surface of each convexity within the first (or each subsequent) nozzle. As illustrated in FIG. 7, internal convexities 42 are used to support a conical shaped nozzle telescope 46. Such a telescope is especially useful for modifying and controlling the noise characteristics of the nozzle because the height of the internal convexities 42 in this configuration determines the frequency of the resultant sound. The convergent-divergent nozzle has eight sets of alternating convexities 42 and cavities 40 ( $n_c$=8), hard edges 44 and is based on an axisymmetric round baseline nozzle with a cone angle α=10°. The nozzle's internal design is such that the convexities (maximal convexity height, δ=0.2) sere as a mount for a conical surface. Numerous telescope/external nozzle configurations are possible; e.g., Bluebell, Bluebell; Bluebell, Chisel-Bluebell; for the external and telescope nozzles respectively. FIG. 8 illustrates an external Bluebell nozzle 60 having an internal Bluebell nozzle telescope 62, with chevrons 64 and 66 respectively.

The contours of a Chisel-Bluebell nozzle embodiment may be calculated in a number of ways. For example, instead of linear, the $\Delta(\phi)$ could vary parabolically, or different widths could be used for the convergent and cavity sections. Referring to FIG. 5B, the dependence of the radius of the nozzle on the azimuthal angle in the cross-section can be described by a periodic function $r=r(\phi)$ with a period $T=2\pi/n_c$. In the first period, $r=r_+$=const for $0 \leq \phi \leq \phi_1$ and $\phi_2 \leq \phi \leq T$, and $r=r_-$=const for $\phi_1 \leq \phi \leq \phi_2$ in which $\phi_1=(0.5)(T-\Delta\phi)$ and $\phi_2=(0.5)(T+\Delta\phi)$. A corrugated surface part is either a "cavity"

or a "convexity" relative to an internal normal to the nozzle wall. A cavity depth(or convexity height), defined by the equality $\Delta r = r_+ - r$, increases along the nozzle centerline from zero at the throat, $x=x_*$, to the maximum value at the exit $\Delta r = \Delta_e r(x-x_*)$. This coincides with the definition of the corrugation amplitude coefficient $\delta$. A cavity (convexity) width, $\Delta\phi=\phi_2-\phi_1$, also linearly increases (decreases) downstream from zero (maximum) at the throat to the maximum (zero) at the nozzle exit, i.e. $2\phi_1=T-\Delta\phi=T\epsilon$, where $\epsilon=(x-x_*)/(x_e-x_*)$. With such a configuration, two expanded flows near the nozzle wall flow from neighboring cavities meet each other at some angle. These flows then mutually penetrate and effectively mix. A flow impulse on the lateral area of the convexities increases the resulting nozzle thrust.

The contours of a Chisel-Bluebell nozzle may also be calculated where the edges of the cavities and convexities have been smoothed. Sharp or "hard" edges of a Chisel-Bluebell nozzle may be made smooth by selection of the function $R(x,\phi)$, which is defined by period T from a super-elliptic equation. See formula (1.1) and explanation for details in Seiner, J. M. and Gilinsky, M. M., 1995, *Nozzle Thrust Optimization while Reducing Jet Noise*, 26th AIAA Fluid Dynamics Conference, Jun. 19–22, 1995/ San Diego, Calif., herein incorporated by reference. The method used to smooth the discontinuous periodic function $r(\phi)$ is accomplished through representation by the first terms of the Fourier series. A cavity (convexity) width can also be varied nonmonotonically, giving a function $\phi_1(\epsilon)$ by the corresponding cubic parabola, or, for example, in the form $\phi_1(\epsilon)=0.5T(\epsilon=\sigma\sin 2\pi\epsilon)$. This curve is characterized by the variation amplitude coefficient a and has the point of inflection at the value of $\epsilon=0.5$. It also makes other dependencies possible. For example, a convexity may be designed to have a triangular cross-section contour in the shape of a "reverse V-shaped wing."

As illustrated in FIGS. 9A and 9B, a Chisel-Bluebell nozzle was designed with 8 sets of alternating convexities 42 and cavities 40 with smoothed edges 50 where p=q=3 based on a cone of the angle $\alpha=10°$. A numerical simulation was completed for this nozzle. The edges were smoothed in a period interval T by two power functions of the fixed even powers p and q, so that: $r(\eta)=r_+-a\eta^p$ for $0\leq\eta\leq\eta_c$ and $r(\eta)=r_--b\eta^q$ for $\eta_c\leq\eta\leq 1$. Here $\eta=\phi/T$. These parabolas cross each other at the given angle $\eta_c$ with the same inclination. The condition of conjugation allows one to calculate coefficients of both parabolas a and b.

Figure 10:
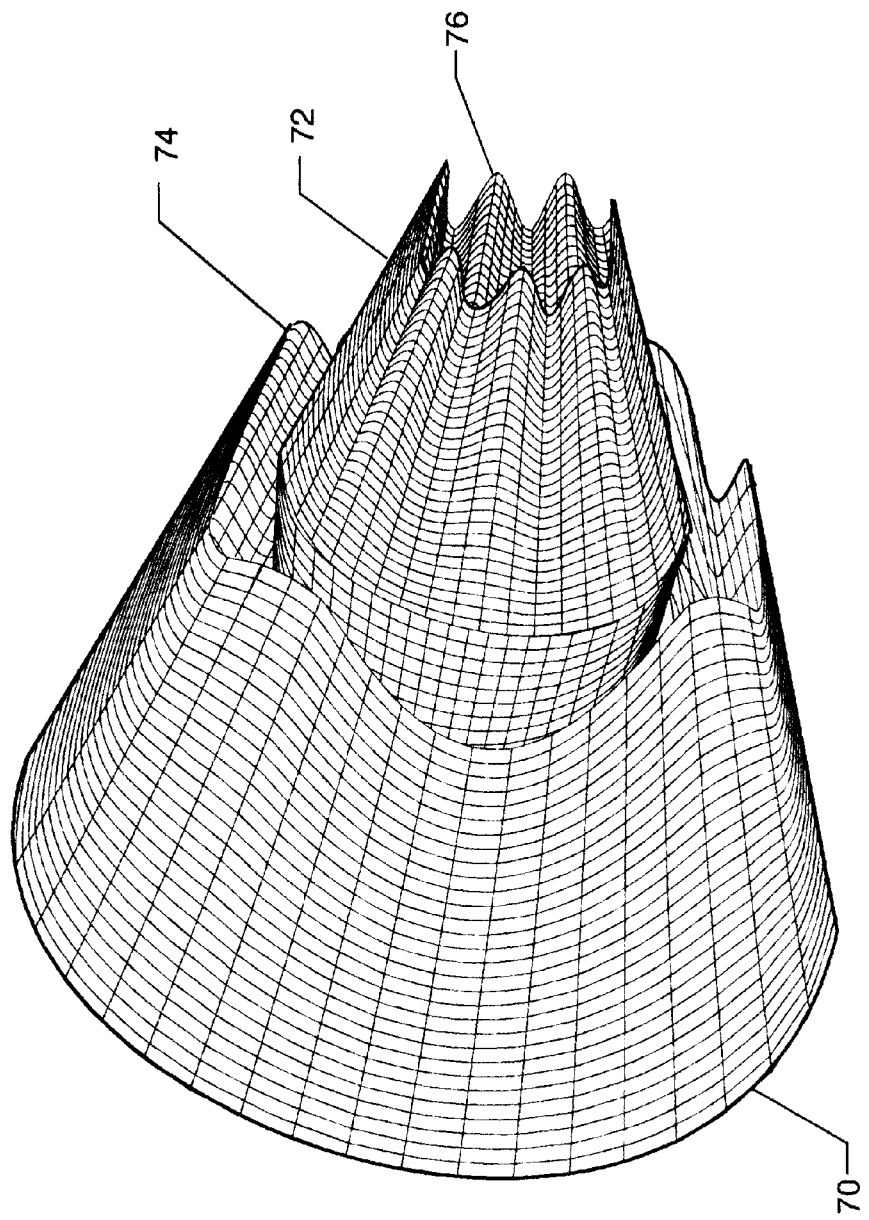
FIG. 10 is a perspective view of a co-annular Bluebell nozzle arrangement.

The Bluebell or Chisel-Bluebell embodiments with or without a telescope can also be used in a coannular arrangement. A co-annular nozzle arrangement having two Bluebell nozzles 70 and 72 with chevrons 74 and 76 respectively is shown in FIG. 10.

Further theoretical details and data are described in J. M. Seiner and M. M. Gilinsky, *Nozzle Thrust Optimization While Reducing Jet Noise*, CEAS/AIAA-95-149, First Joint CEAS/AIAA Aeroacoustics Conference (16th AIAA Aeroacoustics Conference), Jun. 12–15, 1995/Munich, Germany, herein incorporated by reference.

Although the invention has been described relative to specific embodiments thereof, there are numerous other variations and modifications that will be readily apparent to those skilled in the art in light of the above teachings. It is therefore to be understood that, within the scope of the appended claims, the invention may be practiced other than as specifically described herein.

What is claimed as new and desired to be secured by letters patent of the united states is:

What is claimed is:

1. A supersonic nozzle for enhancing exit area mixing, wherein such mixing improves noise suppression and aeroperformance, comprising:

a nozzle structure, the nozzle structure comprising an exit end, an exit edge, an entrance end, an entrance edge, and a surface comprising an inner surface and an outer surface, the inner surface forming a flow passageway for a primary flow through the center of the nozzle structure, the exit edge connecting both the inner and outer surfaces, the entrance edge connecting both the inner and outer surfaces, the entrance edge encircling the entrance end and the exit edge encircling the exit end, and the exit edge having a perimeter;

undulating surface means for introducing counter-rotating vorticity into the primary flow so that when the primary flow passes through the flow passageway, entering at the entrance end and exiting at the exit end, counter-rotating vorticity is introduced into the primary flow without requiring an ejector;

wherein the undulating surface means is the inner surface having one or more corrugations, where an axisymmetric line through each corrugation is coincident with an axisymmetric line through the center of the flow passageway, and where the counter-rotating vorticity is introduced into the primary flow adjacent to the inner surface at each corrugation;

wherein the corrugations extend from a beginning point downstream of the nozzle throat at which the axial flow velocity exceeds the local sound velocity, with the Mach number at the beginning point approximately within the range 1.01 to 1.03;

wherein the corrugations are defined along the nozzle's axial axis such that the variation amplitude of the corrugations increase along the nozzle's axial axis from zero at the corrugations' beginning point to a maximum at the nozzle exit; and further wherein the undulating surface means does not introduce any change to the nozzle's mass flow rate.

2. The nozzle of claim 1, wherein the nozzle further comprises one or more chevrons attached to the exit edge of the nozzle, the chevrons each having a shape and an exposed edge, where the chevrons do not project into the primary flow, and where the nozzle with chevrons attached has an effective exit edge, the effective exit edge having a perimeter, the effective exit edge comprising the exposed edge of the chevrons attached to the nozzle and exit edge of the nozzle not connected to a chevron, so that the perimeter of the effective exit edge is larger than the perimeter of the exit edge.

3. The nozzle of claim 2, wherein the shape of the chevrons is defined by a sinusoidal wave curve, each chevron comprising a peak bounded by two troughs.

4. The nozzle of claim 2, wherein the number of chevrons is equal to the number of corrugations.

5. The nozzle of claim 2, wherein the peak of each chevron coincides with a corrugation of the inner surface where the inner surface is at a maximum radial distance from an axisymmetric line through the center of the nozzle structure measured in a plane perpendicular to the axisymmetric line.

6. The nozzle of claim 1, wherein the nozzle further comprises one or more internal nozzle telescope extensions.

7. The nozzle of claim 1, further comprising an internal nozzle co-annually positioned inside the nozzle and supported by the internal corrugations, wherein a co-annular flow area is formed therebetween.

8. A supersonic nozzle for enhancing exit area mixing, wherein such mixing improves noise suppression and aeroperformance, comprising:

a nozzle structure, the nozzle structure comprising an exit end, an exit edge, an entrance end, an entrance edge, and a surface comprising an inner surface and an outer surface, the inner surface forming a flow passageway for a primary flow through the center of the nozzle structure, the exit edge connecting both the inner and outer surfaces, the entrance edge connecting both the inner and outer surfaces, the entrance edge encircling the entrance end and the exit edge encircling the exit end, and the exit edge having a perimeter;

undulating surface means for introducing counter-rotating vorticity into the primary flow so that when the primary flow passes through the flow passageway, entering at the entrance end and exiting at the exit end, counter-rotating vorticity is introduced into the primary flow without requiring an ejector;

wherein the undulating surface means is the inner surface having one or more sets of alternating cavities and convexities, the cavities and convexities having edges, where the cavities and the convexities alternate along the length of the inner surface and where an axisymmetric line through each cavity and convexity is coincident with an axisymmetric line through the center of the flow passageway, and where the convexities contract from the entrance end towards the exit end, and where the counter-rotating vorticity is introduced into the primary flow adjacent to the convexity edge and adjacent to the inner surface of each cavity; and wherein the cavities and convexities extend from the nozzle throat to the nozzle exit;

wherein the depth of the cavities and the height of the convexities increase along the nozzle's axial axis from zero at the nozzle throat to a maximum at the nozzle exit; and further wherein the undulating surface means does not introduce any change to the nozzle's mass flow rate.

9. The nozzle of claim 3, wherein the nozzle further comprises one or more chevrons attached to the exit edge of the nozzle, the chevrons each having a shape and an exposed edge, where the chevrons do not project into the primary flow, and where the nozzle with chevrons attached has an effective exit edge, the effective exit edge having a perimeter, the effective exit edge comprised of the exposed edge of the chevrons attached to the nozzle and exit edge of the nozzle not connected to a chevron, so that the perimeter of the effective exit edge is larger than the perimeter of the exit edge.

10. The nozzle of claim 9, wherein the shape of the chevrons is defined by a sinusoidal wave curve, each chevron comprising a peak bounded by two troughs.

11. The nozzle of claim 9, wherein the number of chevrons is equal to the number of convexities.

12. The nozzle of claim 8, wherein the cavities and convexities have sharp edges.

13. The nozzle of claim 8, wherein the cavities and convexities have smoothed edges.

14. The nozzle of claim 8, wherein the nozzle further comprises one or more internal nozzle telescope extensions.

15. The nozzle of claim 8, further comprising an internal nozzle co-annually positioned inside the nozzle and supported by the internal convexities, wherein a co-annular flow area is formed therebetween.

16. A supersonic nozzle for enhancing exit area mixing, wherein such mixing improves noise suppression and aeroperformance, comprising:

a nozzle structure, the nozzle structure comprising an exit end, an exit edge, an entrance end, an entrance edge, and a surface comprising an inner surface and an outer surface, the inner surface forming a flow passageway for a primary flow through the center of the nozzle structure, the exit edge connecting both the inner and outer surfaces, the entrance edge connecting both the inner and outer surfaces, the entrance edge encircling the entrance end and the exit edge encircling the exit end, and the exit edge having a perimeter;

means for introducing counter-rotating vorticity into the primary flow comprising the inner surface having eight corrugations, where an axisymmetric line through each corrugation is coincident with an axisymmetric line through the center of the flow passageway;

eight chevrons attached to the exit edge of the nozzle, the chevrons each having a shape and an exposed edge, where the chevrons do not project into the primary flow, and where the nozzle with chevrons attached has an effective exit edge, the effective exit edge having a perimeter, the effective exit edge comprised of the exposed edge of the chevrons attached to the nozzle and exit edge of the nozzle not connected to a chevron, so that the perimeter of the effective exit edge is larger than the perimeter of the exit edge, and where the shape of the chevrons is defined by a sinusoidal wave curve, each chevron comprising a peak bounded by two troughs, and where the peak of each chevron coincides with a corrugation of the inner surface so that the inner surface is at a maximum radial distance from an axisymmetric line through the center of the nozzle structure measured in a plane perpendicular to the axisymmetric line;

so that when the primary flow passes through the flow passageway, entering at the entrance end and exiting at the exit end, counter-rotating vorticity is introduced into the primary flow adjacent to the inner surface at each corrugation without requiring an ejector;

wherein the corrugations extend from a beginning point downstream of the nozzle throat at which the axial flow velocity exceeds the local sound velocity, with the Mach number at the beginning point approximately within the range 1.01 to 1.03;

wherein the corrugations are defined along the nozzle' axial axis such that the variation amplitude of the corrugations increase along the nozzle's axial axis from zero at the corrugations' beginning point to a maximum at the nozzle exit; and further wherein the undulating surface means does not introduce any change to the nozzle's mass flow rate.

17. A supersonic nozzle for enhancing exit area mixing, wherein such mixing improves noise suppression and aeroperformance, comprising:

a nozzle structure, the nozzle structure comprising an exit end, an exit edge, an entrance end, an entrance edge, and a surface comprising an inner surface and an outer surface, the inner surface forming a flow passageway for a primary flow through the center of the nozzle structure, the exit edge connecting both the inner and outer surfaces, the entrance edge connecting both the inner and outer surfaces, the entrance edge encircling the entrance end and the exit edge encircling the exit end, and the exit edge having a perimeter;

undulating surface means for introducing counter-rotating vorticity into the primary flow so that when the primary flow passes through the flow passageway, entering at the entrance end and exiting at the exit end, counter-rotating vorticity is introduced into the primary flow without requiring an ejector;

wherein the undulating surface means is the inner surface having one or more corrugations, where an axisymmetric line through each corrugation is coincident with an axisymmetric line through the center of the flow passageway, and where the counter-rotating vorticity is introduced into the primary flow adjacent to the inner surface at each corrugation;

wherein the corrugations extend from a beginning point downstream of the nozzle throat at which the axial flow velocity exceeds the local sound velocity, with the Mach number at the beginning point approximately within the range 1.01 to 1.03;

wherein the corrugations are defined along the nozzle's axial axis such that the variation amplitude of the corrugations increase along the nozzle's axial axis from zero at the corrugations' beginning point to a maximum at the nozzle exit;

wherein the undulating surface means does not introduce any change to the nozzle's mass flow rate; and further comprising an external nozzle co-annularly positioned about the nozzle, wherein a co-annular flow area is formed therebetween.

18. A supersonic nozzle for enhancing exit area mixing, wherein such mixing improves noise suppression and aeroperformance, comprising:

a nozzle structure, the nozzle structure comprising an exit end, an exit edge, an entrance end, an entrance edge, and a surface comprising an inner surface and an outer surface, the inner surface forming a flow passageway for a primary flow through the center of the nozzle structure, the exit edge connecting both the inner and outer surfaces, the entrance edge connecting both the inner and outer surfaces, the entrance edge encircling the entrance end and the exit edge encircling the exit end, and the exit edge having a perimeter;

undulating surface means for introducing counter-rotating vorticity into the primary flow so that when the primary flow passes through the flow passageway, entering at the entrance end and exiting at the exit end, counter-rotating vorticity is introduced into the primary flow without requiring an ejector;

wherein the undulating surface means is the inner surface having one or more sets of alternating cavities and convexities, the cavities and convexities having edges, where the cavities and the convexities alternate along the length of the inner surface and where an axisymmetric line through each cavity and convexity is coincident with an axisymmetric line through the center of the flow passageway, and where the convexities contract from the entrance end towards the exit end, and where the counter-rotating vorticity is introduced into the primary flow adjacent to the convexity edge and adjacent to the inner surface of each cavity;

wherein the cavities and convexities extend from the nozzle throat to the nozzle to the nozzle exit;

wherein the depth of the cavities and the height of the convexities increase along the nozzle's axial axis from zero at the nozzle throat to a maximum at the nozzle exit;

wherein the undulating surface means does not introduce any change to the nozzle's mass flow rate; and further comprising an external nozzle co-annularly positioned about the nozzle, wherein a co-annular flow area is formed therebetween.

* * * * *